(12) United States Patent
Kadota et al.

(10) Patent No.: US 6,282,357 B1
(45) Date of Patent: Aug. 28, 2001

(54) OPTICAL WAVEGUIDE, ACOUSTO-OPTIC DEFLECTOR AND MANUFACTURING METHOD THEREOF

(75) Inventors: Michio Kadota; Tsuyoshi Iwamoto, both of Kyoto (JP)

(73) Assignees: Murata Manufacturing Co., Ltd., Nagaokakyo; Minolta Co., Ltd., Osaka, both of (JP)

( * ) Notice: Subject to any disclaimer, the term of this patent is extended or adjusted under 35 U.S.C. 154(b) by 0 days.

(21) Appl. No.: 09/386,853

(22) Filed: Aug. 31, 1999

(30) Foreign Application Priority Data

Sep. 2, 1998 (JP) ................................. 10-248580

(51) Int. Cl.[7] ....................................... G02B 6/10
(52) U.S. Cl. ........................... 385/129; 385/130; 385/2; 359/305; 359/245; 438/492; 257/134
(58) Field of Search ..................... 385/129, 130, 385/37, 8, 7, 2; 359/305, 321, 322, 323, 312, 245; 438/492, 928; 257/134, 11

(56) References Cited

U.S. PATENT DOCUMENTS

| | | | |
|---|---|---|---|
| 5,138,407 | * 8/1992 | Hirtz et al. | 257/134 |
| 5,298,457 | * 3/1994 | Einthoven et al. | 438/492 |
| 5,689,362 | * 11/1997 | Kadota | 359/305 |
| 5,790,719 | * 8/1998 | Mitomi et al. | 385/2 |
| 5,825,524 | * 10/1998 | Faderl et al. | 359/245 |
| 5,852,702 | 12/1998 | Nishida et al. | 385/130 |
| 5,878,175 | * 3/1999 | Sonoda et al. | 385/2 |

* cited by examiner

*Primary Examiner*—Loha Ben
(74) *Attorney, Agent, or Firm*—Burns, Doane, Swecker & Mathis, LLP

(57) ABSTRACT

An acousto-optic deflector which has a thin film waveguide layer on a buffer layer formed on a substrate and an IDT and light incidence/emergence means on the thin film waveguide layer. As the thin film waveguide layer, a piezoelectric material such as a ZnO film is used. As the substrate, a material with a resistivity of not more than 20 Ωcm is used. Sezawa waves are excited on the thin film waveguide layer by the IDT, and a laser beam traveling in the thin film waveguide layer is deflected by the Sezawa waves. If the ZnO thin film waveguide layer has a thickness of h and if the excited Sezawa waves have a wavelength of $\lambda$, $0.2 < h/\lambda < 0.5$ is fulfilled.

23 Claims, 1 Drawing Sheet

F I G. 1
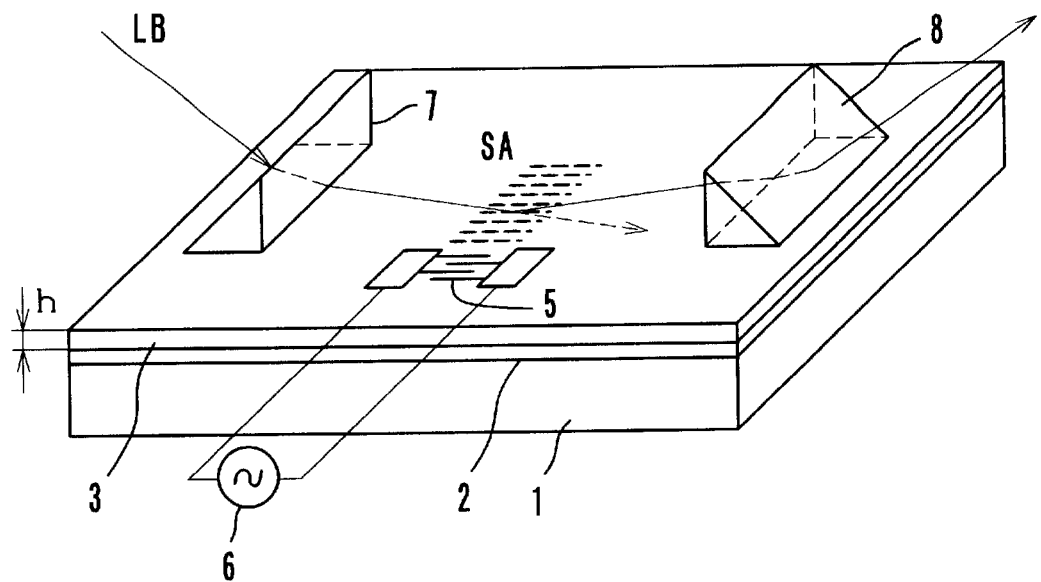
F I G. 2
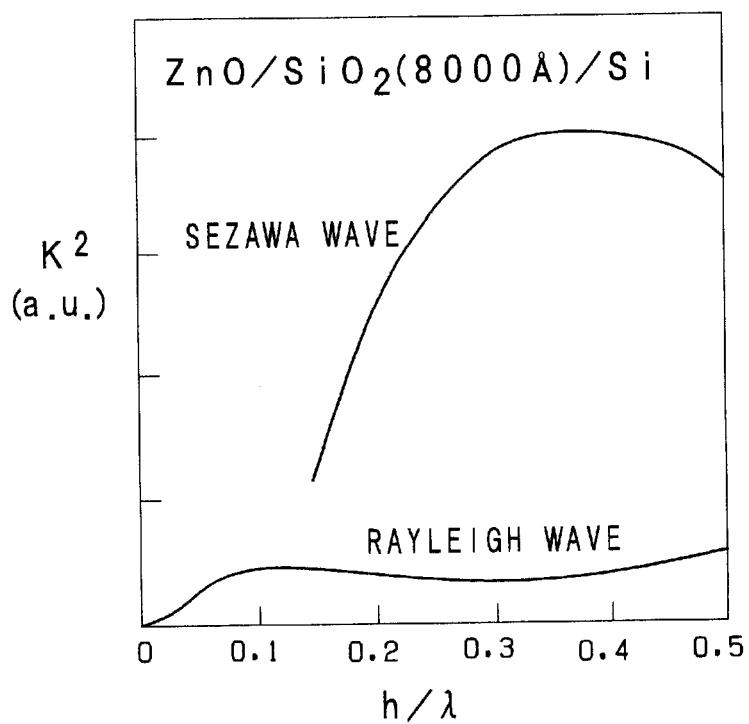

OPTICAL WAVEGUIDE, ACOUSTO-OPTIC DEFLECTOR AND MANUFACTURING METHOD THEREOF

This application is based on application No. 10-248580 filed in Japan, the contents of which are hereby incorporated by reference.

BACKGROUD OF THE INVENTION

1. Field of the Invention

The present invention relates to an optical waveguide and an acousto-optic deflector, and more particularly to an acousto-optic deflector which deflects light traveling in an optical waveguide by surface acoustic waves excited on the optical waveguide.

2. Description of the Prior Art

In an image forming apparatus which uses a laser beam as a light source, generally, the laser beam is deflected by a polygon mirror to scan a photosensitive member. In recent years, however, speed-up of scanning has been demanded, and in order to comply with this demand, various kinds of waveguide type acousto-optic deflectors have been developed.

Well-known structures for such acousto-optic deflectors are a structure wherein a piezoelectric thin film waveguide layer of ZnO or the like is deposited on a substrate of glass, sapphire or silicon with a thermally oxidized surface and a structure wherein a waveguide layer of Ti is formed on a substrate of $LiNbO_3$ by dispersion or by protone exchange. Surface acoustic waves are excited on such a waveguide layer, and the surface acoustic waves and light (a laser beam) traveling in the waveguide layer are made interact. When the light and the surface acoustic waves intersect at an angle satisfying a Bragg condition, Bragg diffraction of the light occurs, thereby resulting in deflection of the light.

When the substrate is sapphire or silicon, Sezawa waves with a high electromechanical coupling coefficient can be excited as the surface acoustic waves, and this is expected to be practical. Also, a silicon substrate is inexpensive and stable. Sezawa waves mean surface acoustic waves which are Rayleigh waves in a high-order mode.

In an optical deflector using a silicon substrate, however, while surface acoustic waves are propagated in the waveguide layer, the energy of the waves is taken by the substrate, and the surface acoustic waves are attenuated. In the meantime, while light is traveling in the waveguide layer, the energy of the light is taken by the substrate, and the light is attenuated. In using silicon for a substrate, there are advantages that the cost is inexpensive and that Sezawa waves, which are efficient, can be excited, whereas there is a problem that surface acoustic waves and light traveling in the waveguide layer are attenuated greatly, thereby lowering the efficiency of use of light. In order to compensate for the lowered efficiency of use of light, it is possible to apply larger electric power to the interdigital transducer or to strengthen the intensity of light emitted from the light source; it, however, results in cost-up of the optical deflector.

SUMMARY OF THE INVENTION

An object of the present invention is to provide an optical waveguide and an acousto-optic deflector which use a silicon substrate, have a high efficiency of use of light and are inexpensive.

From experiments which were made by the inventors so as to attain the object, it became apparent that the attenuation of surface acoustic waves depends on the resistivity of a silicon substrate and the thickness of a buffer layer and that the attenuation of light depends on the thickness of a buffer layer.

Based on these facts, an acousto-optic deflector according to the present invention has a buffer layer and a piezoelectric thin film waveguide layer on a silicon substrate with a resistivity of not more than 20 $\Omega$cm and an interdigital transducer formed on the waveguide layer. Sezawa waves are excited on the waveguide layer by the interdigital transducer, and light traveling in the waveguide layer is deflected by the Sezawa waves.

According to the present invention, since a silicon substrate with a resistivity of not more than 20 $\Omega$cm is used, the propagation loss of surface acoustic waves (Sezawa waves) can be reduced, and the oscillation efficiency can be improved. Sezawa waves are high-order mode waves of Rayleigh waves, and the electromechanical coupling coefficient is large. Also, a silicon substrate is inexpensive and has stable characteristics. The present invention uses a combination of a silicon substrate and Sezawa waves which have such advantages, and the oscillation efficiency of Sezawa waves is high, which results in an improvement in efficiency of use of light. Further, because a buffer layer which has a refractive index lower than that of the substrate is provided, it is possible that a piezoelectric thin film with a refractive index lower than that of the substrate serves as an optical waveguide layer.

Preferably, the waveguide layer is a ZnO film, and the thickness h of the ZnO film and the wavelength $\lambda$ of surface acoustic waves have a mutual relationship of $0.2 < h/\lambda < 0.5$. Experimentally, under this condition, the propagation loss of Sezawa waves is reduced, which results in an improvement in efficiency of use of light.

Moreover, the buffer layer is preferably an $SiO_2$ film. An $SiO_2$ film can be formed easily by oxidizing a surface of a silicon substrate, and with the $SiO_2$ film, the propagation loss of light traveling in the waveguide layer can be reduced. Especially if the thickness of the $SiO_2$ layer is not less than 4000 Å, the propagation loss of light is reduced, and as a synergetic effect with the arrangement of using a silicon substrate with a resistivity of not more than 20 $\Omega$cm, the efficiency of use of light can be more improved.

BRIEF DECRIPTION OF THE DRAWINGS

This and other objects and features of the present invention will be apparent from the following description with reference to the accompanying drawings, in which:

FIG. 1 is a perspective view of an acousto-optic deflector according to the present invention; and FIG. 2 is a graph showing the electromechanical coupling coefficient on the ZnO thickness in the acousto-optic deflector.

DETAILED DESCRIPTION OF THE PREFERRED EMBODIMENTS

Embodiments of an optical waveguide, an acousto-optic deflector and manufacturing method thereof according to the present invention are hereinafter described with reference to the accompanying drawings.

First Embodiment

In the first embodiment, as FIG. 1 shows, an $SiO_2$ film (buffer layer) 2 is formed on a surface of a silicon substrate 1, and a ZnO film (piezoelectric thin film waveguide layer)

3 is provided on the SiO$_2$ film 2. Further, on the ZnO layer 3, an IDT (interdigital transducer) 5 is formed, and rutile prisms 7 and 8 are provided as light incidence/emergence means.

The substrate 1 is a silicon substrate which has a resistivity of 8 Ωcm and is oriented in P (100) direction. For the SiO$_2$ film 2, a surface of the silicon substrate 1 is thermally oxidized and is made into a layer with a thickness of 8000 Å. For the waveguide layer 3, a ZnO film which is oriented in the c-axis is formed by sputtering so as to have a thickness of 2.2 μm. For the IDT 5, an aluminum film with a thickness of 1000 Å is formed on the ZnO film 3 by vapor deposition, and the aluminum film is patterned by a lift-off method. The IDT 5 is a normal type and has 20 pairs of electrode fingers, each of which has a width of 1.45 μm.

To this deflector, a laser beam LB emitted from a light source unit (not shown) which has a laser diode is incident. This laser beam LB is directed into the ZnO film 3 through the rutile prism 7 and travels in the ZnO film 3. Meanwhile, a high-frequency signal is supplied from an electric source 6 to the IDT 5, and thereby, surface acoustic waves (Sezawa waves) SA are excited on the ZnO film 3 in such a way to be propagated in a direction substantially perpendicular to the traveling direction of the laser beam LB. By the interaction with the surface acoustic waves, the laser beam LB is deflected and emergent from the ZnO film 3 through the rutile prism 8.

The buffer layer 2 must have a refractive index smaller than that of the piezoelectric thin film waveguide layer 3 so that light will be propagated in the waveguide layer 3. Because the refractive index of SiO$_2$ is 1.46, which is smaller than the refractive index (1.99) of ZnO and because a SiO$_2$ film can be formed easily by thermally oxidizing a silicon substrate, an SiO$_2$ film is used as the buffer layer 2.

The refractive index of the silicon substrate 1 is 4.0, which is larger than the refractive index (1.99) of the ZnO film 3. Accordingly, if the SiO$_2$ film 2 is too thin, the energy of light traveling in the ZnO film 3 will leak to the substrate 1, which results in a big propagation loss of the light.

In the first embodiment, the SiO$_2$ film 2 has a thickness of 8000 Å, and when a laser beam LB of a wavelength of 630 nm was made incident through the rutile prism 7, the laser beam of TE0 mode had a propagation loss of approximately 2 dB/cm while traveling in the ZnO film 3. For comparison, the thickness of the SiO$_2$ film 2 was changed to 3000 Å, and in the same construction and under the same conditions, the propagation loss of light was approximately 5 dB/cm. From such experiments, it became apparent that the SiO$_2$ film (buffer layer) 2 must have a thickness of at least 4000 Å so as to reduce the attenuation of light traveling in the waveguide layer 3.

In the deflector of the structure shown by FIG. 1, when surface acoustic waves (Sezawa waves) are excited by use of IDT 5, the electromechanical coupling coefficient K$^2$, which indicates the efficiency in exciting surface acoustic waves, depends on h/λ (λ: wavelength of the surface acoustic waves, h: thickness of the ZnO film 3). This characteristic is shown by FIG. 2. In FIG. 2, not only the characteristic of Sezawa waves but also the characteristic of Rayleigh waves are shown for comparison.

In the first embodiment, when an electric signal with a center frequency of 870 MHz was supplied to the IDT 5, Sezawa waves of a wavelength of 5.8 μm were excited. The ZnO film 3 has such a thickness h that h/λ will be 0.38, and the electromechanical coupling coefficient K$^2$ is approximately 4%. The propagation loss of Sezawa waves was 6 dB/cm. For comparison, a silicon substrate which has a resistivity of 1000 Ωcm and is oriented in P (100) direction was used as the substrate 1, and in the same construction and under the same conditions, the propagation loss of Sezawa waves was 26 dB/cm. It is apparent that using a silicon substrate with a resistivity of 8 Ωcm largely reduces the propagation loss of Sezawa waves, and it is preferred to use a silicon substrate with a resistivity of not more than 20 Ωcm.

When the propagation loss of light and the propagation loss of Sezawa waves were reduced in the above-described way, the efficiency of use of light was improved by approximately 1.58 times that of a deflector using a silicon substrate which has a resistivity of 1000 Ωcm and is oriented in P (100) direction.

Second Embodiment

The second embodiment is of the structure shown by FIG. 1. In the second embodiment, a silicon substrate which has a resistivity of 0.02 Ωcm and is oriented in P (100) direction. When Sezawa waves were excited under the same conditions as described in connection with the first embodiment, the propagation loss of Sezawa waves was 7 db/cm. Also, the propagation loss of light was approximately 2 dB/cm. The efficiency of use of light was improved by approximately 1.55 times that of a deflector using a silicon substrate which has a resistivity of 1000 Ωcm and is oriented in P (100) direction.

Other Embodiments

As the silicon substrate, not only a p-type substrate oriented in (100) direction but also a substrate which is of any other type and is oriented in any other direction can be used. The interdigital transducer may be formed on the interface between the SiO$_2$ film and the waveguide layer and may be of a chirp type or a chirp tilt type. As the light incidence/emergence means, it is possible to use coupling means such as gratings as well as prisms.

Although the present invention has been described in connection with the preferred embodiments above, it is to be noted that various changes and modifications are possible to those who are skilled in the art. Such changes and modifications are to be understood as being within the scope of the present invention.

What is claimed is:

1. An optical waveguide comprising:
    a substrate which is made of silicon with a resistivity of not more than 20 Ωcm;
    a buffer layer formed on the substrate; and
    a waveguide layer formed on the buffer layer.

2. An optical waveguide as claimed in claim 1, wherein the waveguide layer is a ZnO film.

3. An optical waveguide as claimed in claim 2, wherein the following condition is fulfilled:

$$0.2 < h/\lambda < 0.5$$

wherein h is a thickness of the ZnO film and λ is a wavelength of Sezawa waves excited on the ZnO film.

4. An optical waveguide as claimed in claim 1, wherein the buffer layer is an SiO$_2$ film.

5. An optical waveguide as claimed in claim 1, wherein the buffer layer has a thickness of not less than 4000 Å.

6. A method of producing an optical waveguide, the method comprising the steps of:
   forming a buffer layer on a substrate which is made of silicon with a resistivity of not more than 20 Ωcm; and
   forming a piezoelectric thin film waveguide layer on the buffer layer.

7. A method as claimed in claim 6, wherein the piezoelectric thin film waveguide layer is a ZnO film.

8. A method as claimed in claim 7, wherein the ZnO film is formed by a sputtering method.

9. A method as claimed in claim 7, wherein the ZnO film is so formed such that the following condition is fulfilled:

$$0.2 < h/\lambda < 0.5$$

wherein h is a thickness of the ZnO film and $\lambda$ is a wavelength of Sezawa waves excited on the ZnO film.

10. A method as claimed in claim 6, wherein the buffer layer has a thickness of not less than 4000 Å.

11. A method as claimed in claim 6, wherein the buffer layer is an $SiO_2$ film.

12. A method as claimed in claim 11, wherein the $SiO_2$ film is formed by thermally oxidizing the silicon substrate.

13. An acousto-optic deflector comprising:
   a substrate which is made of silicon with a resistivity of not more than 20 Ωcm;
   a buffer layer formed on the substrate;
   a piezoelectric thin film waveguide layer formed on the buffer layer; and
   an interdigital transducer which is so formed to abut on the piezoelectric thin film waveguide layer and excites Sezawa waves on the waveguide layer;
   wherein, light traveling in the waveguide layer is deflected by the Sezawa waves.

14. An acousto-optic deflector as claimed in claim 13, wherein the piezoelectric thin film waveguide layer is a ZnO film.

15. An acousto-optic deflector as claimed in claim 14, wherein the following condition is fulfilled:

$$0.2 < h/\lambda < 0.5$$

wherein h is a thickness of the ZnO film and $\lambda$ is a wavelength of the Sezawa waves excited on the ZnO film.

16. An acousto-optic deflector as claimed in claim 13, wherein the buffer layer is an $SiO_2$ film.

17. An acousto-optic deflector as claimed in claim 13, wherein the buffer layer has a thickness of not less than 4000 Å.

18. A method of producing an acousto-optic deflector, the method comprising the steps of:
   forming a buffer layer on a substrate which is made of silicon with a resistivity of not more than 20 Ωcm;
   forming a piezoelectric thin film waveguide layer on the buffer layer; and
   forming an interdigital transducer on the piezoelectric thin film waveguide layer.

19. A method as claimed in claim 18, wherein the piezoelectric thin film waveguide layer is a ZnO film.

20. A method as claimed in claim 19, wherein the ZnO film is so formed that the following condition is fulfilled:

$$0.2 < h/\lambda < 0.5$$

wherein h is a thickness of the ZnO film and $\lambda$ is a wavelength of Sezawa waves excited on the ZnO film.

21. A method as claimed in claim 18, wherein the buffer layer has a thickness of not less than 4000 Å.

22. A method as claimed in claim 18, wherein the buffer layer is an $SiO_2$ film.

23. A method as claimed in claim 22, wherein the $SiO_2$ film is formed by thermally oxidizing the silicon substrate.

* * * * *